Dec. 19, 1933.  H. D. FREITAG  1,940,491
GROUND GUARD FOR ELECTRIC POWER STATIONS
Filed Dec. 8, 1932   3 Sheets-Sheet 1
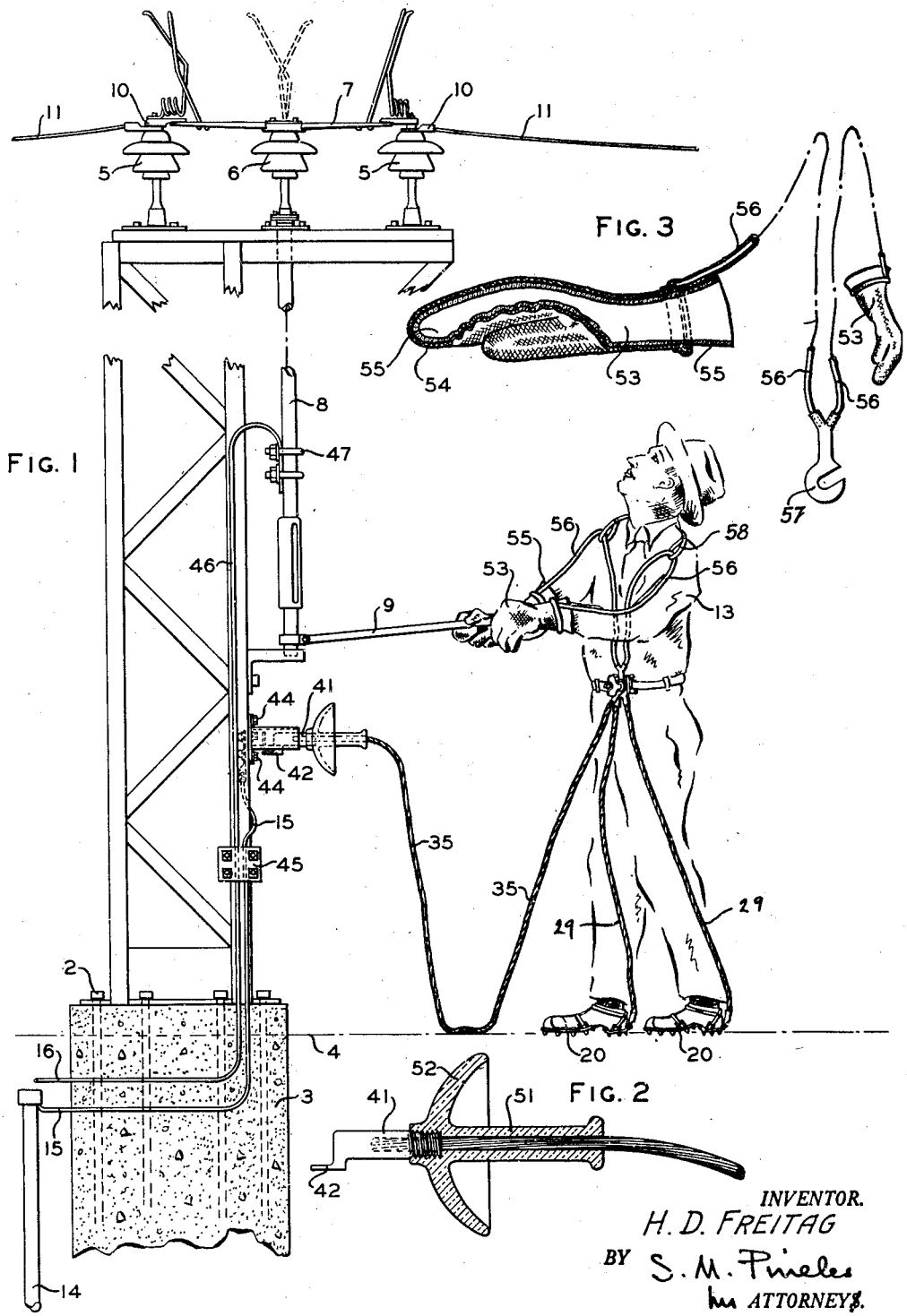
INVENTOR.
H. D. FREITAG
BY S. M. Pineles
his ATTORNEYS.

Dec. 19, 1933.   H. D. FREITAG   1,940,491
GROUND GUARD FOR ELECTRIC POWER STATIONS
Filed Dec. 8, 1932    3 Sheets-Sheet 2
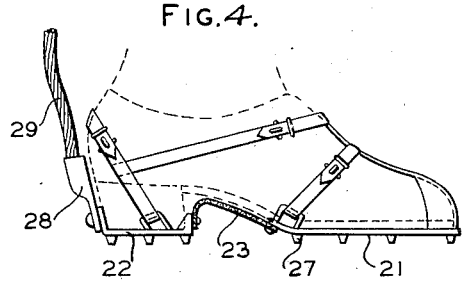
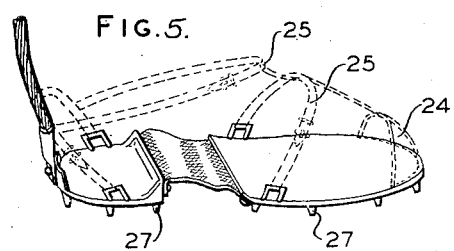
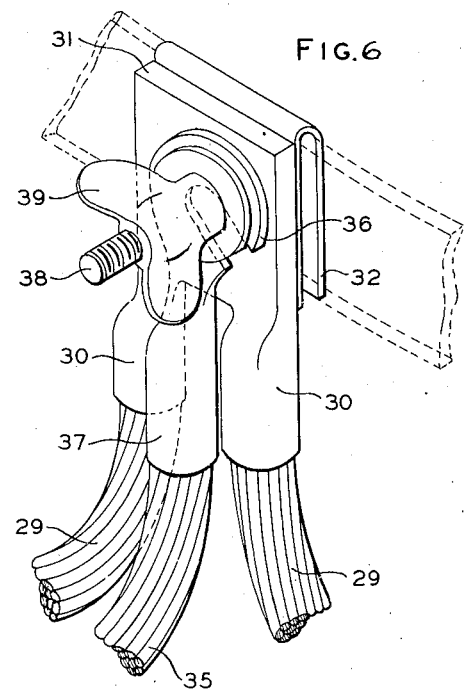
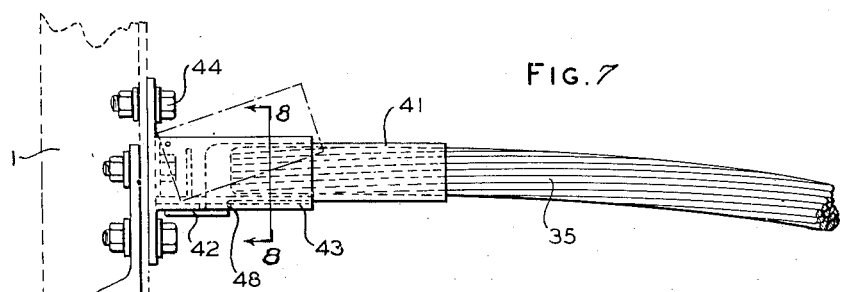
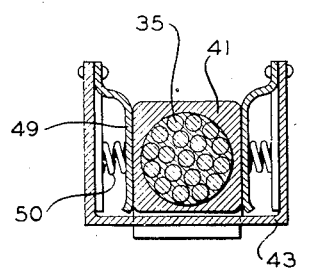
INVENTOR.
H. D. Freitag
BY
ATTORNEYS.

Dec. 19, 1933.  H. D. FREITAG  1,940,491
GROUND GUARD FOR ELECTRIC POWER STATIONS
Filed Dec. 8, 1932  3 Sheets-Sheet 3
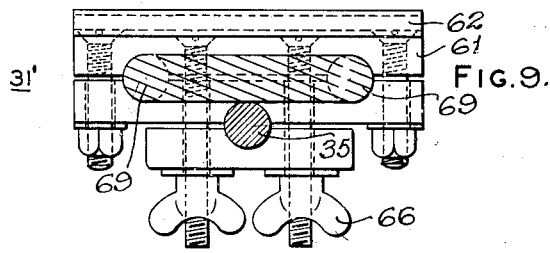
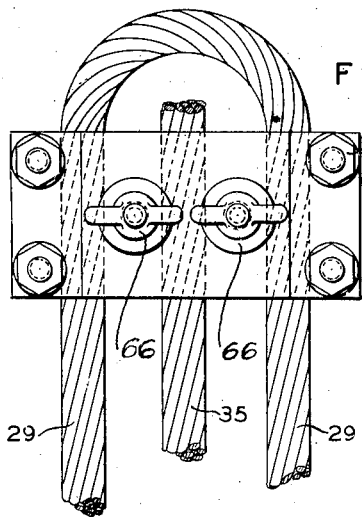
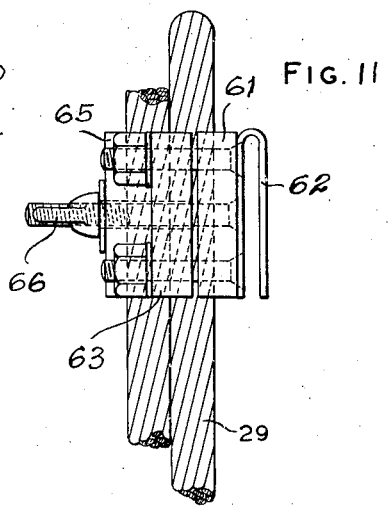
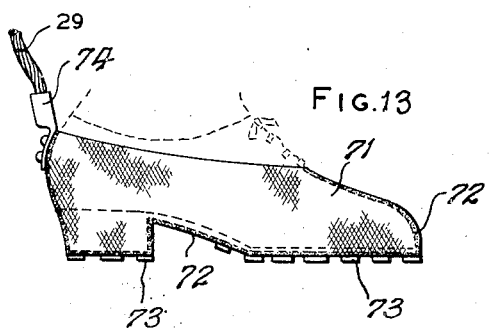
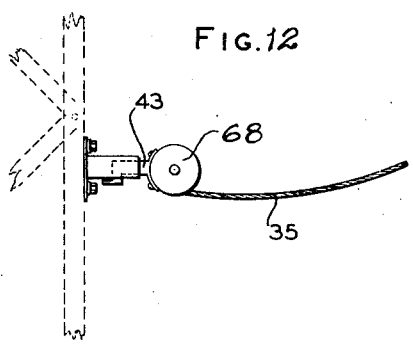
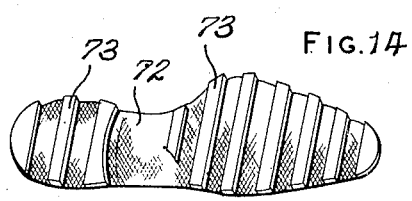

Patented Dec. 19, 1933

1,940,491

UNITED STATES PATENT OFFICE 1,940,491

GROUND GUARD FOR ELECTRIC POWER STATIONS

Henry Daniel Freitag, Lynbrook, N. Y., assignor of one-half to Philip Sporn, Brooklyn, N. Y.

Application December 8, 1932. Serial No. 646,335

9 Claims. (Cl. 175—265)

This application is a continuation in part of my copending application, Serial No. 546,511, filed June 24, 1931, which is made a part hereof.

This invention relates to ground guards for electric power stations, and has among its objects the provision of an improved and efficient protective equipment for preventing electrocution of or damage to a person working on or operating the apparatus in the stations and the yards of electric power systems and the like.

The objects of the invention will be best understood from the following description of exemplifications thereof, reference being had to the accompanying drawings wherein Fig. 1 is a diagrammatic view of a portion of an electric power station illustrating the protective equipment and its use;

Fig. 2 is a side view of the connecting plug and handle therefor;

Fig. 3 is a view, partially in section, of the protective glove equipment;

Fig. 4 is a side view of the foot member constituting a part of the protective equipment;

Fig. 5 is a perspective view of the foot member of Fig. 4;

Fig. 6 is a perspective view of the attachment for carrying the conductors of the protective equipment;

Fig. 7 is a side view of the socket and plug connection of the equipment;

Fig. 8 is a cross-sectional view of the plug and socket connection along line 8—8 of Fig. 7;

Fig. 9 is a top view of a modified form of conductor attachment;

Fig. 10 is a front elevation of the attachment of Fig. 9;

Fig. 11 is a side elevation of the attachment of Fig. 9;

Fig. 12 is a side view of a modified form of the plug and socket connection; and Figs. 13 and 14 are side and bottom views, respectively, of a modified form of protective footwear.

To those unfamiliar with the actual operating conditions of modern electric power systems, it may seem that men working around electrical apparatus encased in iron or other metal, that are connected to a ground, or in general, having metallic parts that are grounded, are fully protected against danger due to flashovers from the high voltage line to such metallic parts, such as frequently occur in practice. As a matter of practical experience, however, this is not the case, and there is a yearly toll of lives among the operating personnel of power stations, due to flashovers to apparently grounded metallic portions of the station apparatus where the ground utterly fails in its protective purposes.

The reasons for the failure of the ground as a protection in cases of flashover to the grounded metallic parts of the station apparatus may be best explained by reference to Fig. 1 of the drawings which shows a portion of the switching yard of a power station, having an iron framework column 1 supported by means of bolts 2 on a concrete foundation block 3 imbedded in the ground to the level 4 and carrying at its upper end, which is usually at least 12 feet above the ground, insulators 5, 6 of a disconnecting switch, for instance, the control insulator 6 carrying the switch blade 7 and being arranged to be rotated by means of an iron rod 8 that is actuated by a lever 9. The insulators 5 carry stationary terminals 10 of the disconnecting switch which have joined thereto the high voltage conductor sections 11, the circuit of which is closed and opened by the rotary movement of the blade member 7.

As is well known, such disconnecting switches, like other high voltage apparatus, are liable to flashover and direct contact between the high voltage conductors and the supporting metallic members that are mounted on the ground. For instance, in the case of a disconnecting switch, it often happens that when the line conductors 11 carry a heavy current, and for some reason the disconnecting switch 7 is opened by an operator while under heavy current, an arc will be formed and flashover to the iron framework 1, sending a heavy current through the framework by way of the ground. In modern electric power stations with the tremendous generating capacities of the interconnected stations, enormous currents may flow to the ground in case of such flashovers. It is clear that in the case described, the operator holding the lever 9 would be immediately electrocuted in case of such flashover, where the iron supporting framework 1 is merely connected to the ground by the bolt connections 2 with the concrete block, since such concrete block represents a very high resistance, and accordingly, a very high voltage drop would develop between the iron framework and the metallic parts connected thereto and the ground around the iron column. Substantially the full voltage of the line would in such case be applied to the body of the operator and would result in his immediate electrocution.

To protect against such danger, power stations and power equipment liable to flashover are as a rule equipped with special grounds. For instance, in the case under consideration, as shown in Fig.

1, there is driven into the ground adjacent to the column 1, a ground rod 14, and similar ground rods are provided adjacent the other supporting columns of which there are as a rule a number at a station. Each column is connected to its ground rod by means of a ground conductor 15, and the several columns are interconnected by grounding conductors 16, so that in effect, all the metallic portions of the station are connected to the ground by a plurality of grounding rods, and the several grounding rods are connected in parallel, so as to increase the connection to the ground.

Were the grounding resistance of these grounding rods 14 zero, they would constitute substantially complete protection in case of a flashover, such as described above. As a practical matter, it is impossible, however, to make the resistance of these grounding rods with the ground zero. In most cases, the resistance between the grounding rods and the ground has quite substantial values, and in some cases, this resistance may be as high as fifty ohms, although power stations use their utmost endeavors to keep this grounding resistance lower, and if possible, not more than fifteen ohms. Theoretically, the ground resistance of such grounding rods or other grounds used begins at a point close to the rod and ends at a substantial distance away. In most cases the ground resistance is practically within some forty or fifty feet of the metallic rods and the major part of the resistance is within some six feet, although this varies greatly with the character of the soil, its moisture content and its temperature. Very often, a point two to four feet away from the ground may have a potential about seventy per cent lower than the potential of the supporting column, and more than twenty per cent higher than a point ten feet away from the column. It is clear that under such conditions, with ground currents that may assume values from 1,000 to 4,000 amperes, there will be applied to the operator or the person standing near the apparatus, a potential difference of thousands of volts, bringing about the electrocution of the person, or serious damage, notwithstanding even careful grounding of the station.

The problems of protection due to insufficient grounding are rendered still more difficult by a number of factors which affect the ground resistance. One of these factors is the composition of the soil. Another factor is the moisture content. The moisture content varies greatly during different periods of the year, and at one time the ground resistance may be low, offering more protection, and at other times during the year the ground resistance will become high due to small moisture content, and the ground will offer insufficient protection. Some soils have such high resistance that special salts have to be added to decrease it. These salts wear away and the resistance undergoes a change, becoming for a time too high for effective protection. Another factor is the temperature. When the ground freezes, the ground resistance usually rises very rapidly, even as much as forty times as the soil goes from freezing to ten degrees above zero. In view of these difficulties and the practical impossibility of holding the ground resistance of the protective grounds down to a value at which the surge currents to ground in case of flashover or the like, do not develop high voltage differences in the neighborhood of the ground and the apparatus mounted on the ground, there is a heavy yearly loss in the lives of the operating personnel of the power stations and a continuous effort is being made to eliminate these deaths and the damages accompanying the same.

It has been proposed, and to a certain extent there are in use, protective grounding plates placed over the operating positions where the operator usually stands in operating, say, a disconnecting switch as shown in Fig. 1, the grounding plate being connected to the grounding rod 14, so that it is at the same potential as the grounding rod and as the iron column 1. With such arrangement there is no potential difference between the place where the operator stands and the iron column 1, and the grounding rod 14, and accordingly, no dangerous voltage difference can be applied to his body.

While theoretically the grounding plate is a desirable improvement and helps to decrease the death toll, it proved insufficient for a number of reasons. In the first instance, it is not sufficient to provide a grounding plate only in the limited space in front of the operating handle of a disconnecting switch or another piece of apparatus, because very often a man is endangered in passing on another side of the column or of the metallic apparatus, or in approaching the operation positions. Accordingly for full protection, it would be necessary to extend the grounding plate not only to the space under the operating position, but to the entire space around the metallic portions of the structure resting on the ground, and even that would be insufficient as sometimes even portions of the ground that are relatively remote from the grounded structure, say ten to fifteen feet away therefrom, are brought to dangerous potentials due to heavy surge currents to ground. Accordingly, for complete protection it would be necessary to cover the entire surface of the yard of an operating station with a metallic floor. However, metallic floors are undesirable for such stations because when wet, they often cause slipping of the personnel walking thereover, and what is more important, the value of such iron plates becomes greatly reduced in winter time when they are covered with snow or a layer of ice which has at points relatively high resistance. For these and other reasons, metallic floors for high voltage outdoor stations and yards are practically ruled out and thus fail to provide a solution for the burning problem of protecting the personnel against electrocution by the ground surges.

By the protective equipment of my invention I secure all the benefits of a completely grounded metallic floor without its disadvantages, and at a fraction of its cost. The protective equipment of my invention as practically used by an operator is shown in Fig. 1. The operator carries on the bottom of his shoes metallic sandals 20 shown in detail in Figs. 4 and 5. These sandals may comprise, for instance, a sole part 21, and a heel part 22, of metal, connected by means of a flexible metal braid 23, and provided with a toe portion 24 and buckled straps 25 so as to be readily attachable to and detachable from the feet of the person intending to enter the yard or the space near the high voltage apparatus. The sole portion 21 and the heel portion 22 of the sandals may be provided with spikes 27 to secure a good hold on the ground and prevent slipping. The heel member 22 carries on its rear side a bracket 28 soldered or brased over the end of a flexible conducting cable 29 made of copper strands, for instance, the cables 29 from the two sandals having their upper ends both secured and electrically connected to brackets 30 extending from a connecting block 31, so that through the two flexible cables 29 and the connecting block 31 the metallic surfaces of the two sandals 20 are short-circuited and always maintained at the same potential.

The block 31 has on its rear side a U-shaped bracket 32 so that the block may be readily suspended on the belt or other portion of the clothing of the operator, the two cables 29 being of sufficient length to permit the man to walk free from interference.

By means of an additional flexible conducting cable 35 which may likewise be of copper strands, a connection is effected between the sandal cables 29 and the grounding conductor 15 by means of which the iron column 1 is connected to the grounding rod 14. One end of the cable 35 carries a metallic hook 36 to which it is mechanically and electrically connected by means of a bracket 37. The metallic hook 36 fits over a bolt 38 extending from the connecting block 31 and is arranged to be locked in place by means of a wing nut 39 so as to establish a quickly detachable, firm conducting connection between the conducting cable 35 and the sandal cables 29. The other end of the connecting cable 35 carries a metallic plug 41 having a catch member 42 adapted to fit into a U-shaped metallic socket member 43 secured to the metal tower 1 by means of bolts 44, and having a direct conducting connection with the conductor 15 by means of which the tower 1 is grounded, at the clamp 45.

To secure complete protection, the interconnecting conductor 16 is also clamped by clamp 45 and the extension conductor 46 has its end fastened by clamp 47 to the operating rod 8 so as to insure that the rod is at all times at the same potential as the ground conductors 15 and 16 and the grounding rod 14.

The plug and socket members 41 and 43 are shown in detail in Figs. 2, 7 and 8. The plug member 41 is made of good conducting material and has at its front end a projecting member 42 fitting into a transverse slot 48 on the bottom of the socket member 43, the flat sides of the plug being held by spring member 49 pressed against the plug sides by additional springs 50 to assure that upon inserting the plug member 41 into the socket and swinging it downward, it is held firmly locked in good contact with the socket, and through its connection with the grounding conductor 15 at the potential of the grounding rod 14 and of the tower 1.

The rear end of the plug 41 has an opening into which is fitted and braised the end of cable 35 to make a good conducting connection. A grip sleeve 51 of insulating material, such as rubber, having a protecting shield 52 at the front end, is firmly mounted on the rear end of the plug member to enable the person using the equipment to hold the plug and insert it into the socket with his hand insulated from the member making contact between the foot plate 21 and the iron column. This insures against the danger of a current flow into the hand and body of the operator if at the moment he touches with the plug the metal socket, a short circuit current flows through the iron column to ground. The sleeve 51 is of sufficient length to assure that the hand of the operator shall not come in contact with the plug 41 or the cable 35, and the shield 52 adds protection against accidental touching of the socket with the hand, and against flashovers.

The connecting cable 35 is made sufficiently long so as to permit any person equipped like the operator shown in Fig. 1 to move over the entire space around the apparatus throughout the entire possible danger zone. In case of a flashover to the grounded metallic parts and a flow of heavy current into the ground and consequent rise of the potential at the place where the operator or the man so equipped stands, nothing can happen to him because his feet are at the same potential as the column and the grounding rod and there is no potential difference applied to any two spaced portions of his body. With the use of this equipment all the difficulties with metal plates are eliminated and a high degree of protection is secured that is not in any way dependent on atmospheric conditions and is not affected by climatic conditions.

Additional protection is given the operator by providing for him a pair of protecting gloves 53 which have an outer conducting layer 54 made, for instance, of pliable copper wire texture and an inner insulating lining 55 extending for a distance beyond the rear edge of the conducting layer 54. The lining 55 may be of rubberized cotton material or rubber, for instance, which satisfactorily insulates the hand of the operator in the interior lining 55 from the outer conducting layer 54. The rear portions of the conducting outer glove layers 54 of the two gloves have conductively connected thereto the ends of two flexible externally insulated conducting cables 56 having their other ends mechanically and electrically connected to a metallic hook 57 fitting over bolt 38 of the belt block 31 and arranged to be locked in place beside the similar cord hook 36 by wing nut 39 to establish a good connection to cables 29 and 35. The glove cables 56 are sufficiently long to permit the operator free use of his hands, the cables being, for instance, suspended on a loop member 58 placed around the neck. The provision of the gloves serves as an additional assurance that no current will tend to flow through the body of an operator if he grips with his hand a switch lever or other metal parts of the apparatus.

Instead of mounting the grounding socket 43 on the tower 1 supporting the disconnecting switch or on the casing of the electrical apparatus, special socket holders may be mounted at spaced distances of about ten feet around the yard, so that the man entering the dangerous zone can secure complete protection against ground surges and electrocution by ground current at any part of the yard.

In Figs. 9 to 11 is shown a modified form of attachment for supporting the two sandal cables and for connecting the connecting cable 35. The attachment 31' comprises a supporting block 61 having a bracket 62 for attachment to the belt or clothing of the operator, the cables extending from the sandals being continuous and forming a loop which has its central portion clamped against the block 61 by means of a clamping plate 63 held in place by four bolts 64. A good, firm connection with the connecting cable 35 is effected by an additional clamping plate 65 which is held clamped over the end of the cable 35 by means of two wing nuts 66.

In some cases, it may be desirable to avoid an excessively long connecting cable 35 dragging about on the ground. In such cases, the plug 43 arranged as shown in Figs. 7 and 8 may have on its rear end a reel 68 as shown in Fig. 12, which reel has wound on it the connecting cable 35 and permits it to roll off as needed. The reel may be provided with a spring which normally tends to hold the cable rolled over the reel, but without excessive pressure, so as to permit ready unrolling thereof under the force imparted by the pull exercised by the movement of the person carrying the equipment.

Instead of sandals as shown in Figs. 4 and 5, many other forms of footwear may be used, such as that shown in Figs. 13 and 14, comprising a slipper 71 of rubber or the like, adapted to be slipped over the shoe and equipped with a conducting lining 72 of braided conductor, such as copper, over its entire bottom surface and with spaced conducting strips 73 on the soles and heels. At the rear end, the slippers carry connecting brackets 74 for establishing a conducting connection between the braid 72 and the conductor cables 29.

The invention is not limited to the specific details of construction and arrangements described above, but many other modifications thereof will suggest themselves to those skilled in the art. It is accordingly desired that the appended claims be given a broad construction commensurate with the scope of the invention within the art.

I claim:

1. A protective device for use by persons operating high voltage apparatus provided with a metallic member normally insulated from the high voltage apparatus for holding or manipulating the same and having a ground conductor embedded in ground subject to high current surges to said ground, said device comprising a pair of metallic conducting foot-members having means for holding the same on the feet of the person, and a conducting cord detachably establishing a flexible low resistance conducting connection between said foot-members and said ground conductor arranged to permit walking movement of the person wearing said foot-members in the vicinity of said apparatus and not interfering with the gripping of said member by said person while maintaining the feet of said person at all times at the potential of said ground conductor.

2. A protective device for protecting persons operating high voltage apparatus provided with a metallic member normally insulated from the high voltage apparatus for holding or manipulating the same and having a conducting portion connected to a ground conductor embedded in the ground and subject to high current surges to said ground, said device comprising a pair of metallic conducting foot-members having means for securing the same on the under side of the feet of the person, a flexible low resistance conductor extending between said foot-members and a flexible conductor connection detachably connecting said foot-members and the first connecting conductor to said ground conductor and being sufficiently long not to interfere with the walking of the person in the region within which the surge currents to ground are likely to introduce dangerous voltages and not to interfere with the gripping of said member by said person.

3. A protective device for use by persons operating high voltage apparatus provided with a metallic member normally insulated from the high voltage apparatus for manipulating or holding the same and having a ground conductor embedded in ground and subject to high current surges to said ground, said device comprising a pair of metallic conducting foot-members having means for securing the same to the feet of the person, a flexible low resistance conductor extending between said foot-members of sufficient length to form a loop permitting suspension of the middle portion thereof near the upper ends of the legs of the person, an attachment for detachably attaching said middle portion of said flexible conductor to the body of the person to permit substantially unobstructed movement of the person, a second flexible conductor detachably connecting said foot-members and the first conductor therebetween to said ground conductor to maintain the feet of said person at all times at the potential of said ground, said second flexible conductor being of sufficient length to permit walking of the person throughout the region within which surge currents to ground are likely to induce dangerous voltages and not to interfere with the gripping of said member.

4. In combination with a station having high voltage elements with a metallic member normally insulated from said elements for holding or manipulating the same and a ground conductor to which said metallic member is connected, protective equipment for a person standing or walking in the neighborhood of said apparatus and gripping said member, comprising a pair of metallic conducting foot-members having means for holding the same on the feet of the person, and means for establishing a detachable flexible low resistance conducting connection between said foot-members and said ground conductor arranged to permit walking movement of the person wearing said foot-members in the vicinity of said apparatus and permit gripping of said member while maintaining the feet of said person at all times at the potential of said ground conductors.

5. In combination with a station having high voltage elements with a metallic member insulated from said elements for holding or manipulating the same and a ground conductor to which said metallic member is connected, protective equipment for a person standing or walking in the neighborhood of said apparatus and gripping said member, comprising a pair of metallic conducting foot-members having means for securing the same to the feet of the person, a flexible low resistance conductor extending between said foot-members of sufficient length to form a loop permitting suspension of the middle portion thereof near the upper ends of the legs of the person, an attachment for detachably attaching said middle portion of said flexible conductor to the body of the person to permit substantially unobstructed movement of the person, a second flexible conductor detachably connecting said first conductor to said ground conductor to maintain the feet of said person at all times at the potential of said ground, said second flexible conductor being of sufficient length to permit walking of the person throughout the region within which surge currents to ground are likely to induce dangerous voltages over the ground surface.

6. A protective device for protecting persons operating high voltage apparatus provided with a metallic member normally insulated from the high voltage apparatus for holding or manipulating the same and having a conducting portion connected to a ground conductor embedded in the ground and subject to high current surges to said ground, said device comprising a pair of metallic conducting foot-members having means for securing the same on the under side of the feet of the person, a pair of gloves for the hands of the person having an electrically conducting exterior surface, a flexible low resistance connecting conductor extending between said foot-members and conducting parts of said gloves interconnecting the same, and a flexible conductor connection detachably connecting said foot-members, the conducting surface of said gloves, and the first connecting conductor to said ground conductor and being of sufficient length to permit walking of the person in the region within which the surge currents to ground are likely to introduce dangerous voltages and not to interfere with the gripping of said member by the gloves of said person.

7. A protective device for use by persons operating high voltage apparatus provided with a metallic member normally insulated from the high voltage apparatus for manipulating or holding the same and having a ground conductor embedded in ground and subject to high current surges to said ground, said device comprising a pair of metallic conducting foot-members having means for securing the same to the feet of the person, a flexible low resistance conductor extending between said foot-members of sufficient length to form a loop permitting suspension of the middle portion thereof near the upper ends of the legs of the person, a pair of gloves for the hands of the person having an electrically conducting exterior surface, a second flexible low resistance conductor extending between the conducting parts of said gloves of sufficient length to form a loop permitting suspension of the middle portion thereof at the point of suspension of said first conductor, an attachment for detachably attaching said middle portions of said first and second flexible conductors to the body of the person to permit substantially unobstructed movement of the person, a third flexible conductor detachably connecting said first and said second conductors therebetween and to said ground conductor to maintain the under side of the feet and the conducting surface of said gloves of said person at all times at the potential of said ground, said third flexible conductor being of sufficient length to permit walking of the person throughout the region within which surge currents to ground are likely to induce dangerous voltages and not to interfere with the gripping of said member.

8. In combination with a station having high voltage elements with a metallic member normally insulated from said elements for holding or manipulating the same and a ground conductor to which said metallic member is connected, protective equipment for a person standing or walking in the neighborhood of said apparatus and gripping said member, comprising a pair of metallic conducting foot-members having means for holding the same on the feet of the person, a pair of gloves for the hands of the person having an electrically conducting exterior surface and an interior lining insulating the hand from said exterior surface, and means for establishing a detachable flexible low resistance conducting connection between said foot-members, the conducting surface of said gloves, and said ground conductor arranged to permit walking movement of the person wearing said foot-members in the vicinity of said apparatus and permit gripping of said member while maintaining the feet and gloves of said person at all times at the potential of said ground conductor.

9. A protective device for protecting persons operating high voltage apparatus provided with a metallic member normally insulated from the high voltage apparatus for holding or manipulating the same and having a conducting portion connected to a ground conductor embedded in the ground and subject to high current surges to said ground, said device comprising a pair of metallic conducting foot-members having means for securing the same on the under side of the feet of the person, a pair of gloves for the hands of the person having an electrically conducting exterior surface and an interior lining insulating the hand of the person from the exterior conducting surface, and a flexible low resistance conductor extending between said foot-members and conducting parts of said gloves interconnecting the same for providing a current bypass between the conducting exterior of said gloves to the grounded foot-members while maintaining the hands of the person insulated.

HENRY DANIEL FREITAG.